United States Patent [19]

Puskar

[11] Patent Number: 4,592,463

[45] Date of Patent: Jun. 3, 1986

[54] ROLLER WITH DOUBLE LEFT AND DOUBLE RIGHT HELIX PATTERN TRACK

[76] Inventor: Halil Puskar, 1200 Andria La., Des Plaines, Ill. 60018

[21] Appl. No.: 627,990

[22] Filed: Jul. 5, 1984

[51] Int. Cl.[4] .................. B65G 39/10; B65G 39/16
[52] U.S. Cl. .................................. 198/842; 29/121.4; 474/184; 474/188; 198/840
[58] Field of Search .............. 198/667, 669, 840–843; 474/184, 187–189, 122; 226/190, 192; 242/76; 29/110, 121.4, 121.5, 121.6, 127, 128; 384/518, 563, 562, 542, 585

[56] References Cited

U.S. PATENT DOCUMENTS

| | | | |
|---|---|---|---|
| 2,176,835 | 10/1939 | Cumfer | 29/121.4 X |
| 2,743,810 | 5/1956 | Armstrong | 198/843 |
| 3,428,373 | 2/1969 | Imse | 384/562 |
| 3,888,131 | 6/1975 | Reid | 198/843 |
| 3,912,347 | 10/1975 | Pflugner et al. | 384/585 |
| 3,961,737 | 6/1976 | Fatula | 474/187 X |
| 4,180,155 | 12/1979 | Stevick | 474/189 X |
| 4,386,812 | 6/1983 | Anderson | 384/542 |

FOREIGN PATENT DOCUMENTS

| | | | |
|---|---|---|---|
| 0538939 | 8/1941 | United Kingdom | 384/518 |
| 0910804 | 11/1962 | United Kingdom | 198/498 |
| 0791570 | 12/1980 | U.S.S.R. | 198/498 |

Primary Examiner—Joseph E. Valenza
Assistant Examiner—Lyle Kim
Attorney, Agent, or Firm—Silverman, Cass & Singer, Ltd.

[57] ABSTRACT

A conveyor belt roller having a pair of opposed double tracks or threads formed on the surface thereof. Each pair of tracks spirals around the roller a plurality of times to provide a respective double helix pattern track running left and right from the midpoint of said roller. Each respective double helix pattern track commences upon the roller surface at starting points positioned 180° apart about the circumference of the roller, and extends to the respective ends of the roller. The roller also is provided with interchangeable bearing and shaft housings for mounting at the respective ends of the roller to maintain the same in desired disposition during operation of the conveyor belt associated with the roller.

5 Claims, 14 Drawing Figures

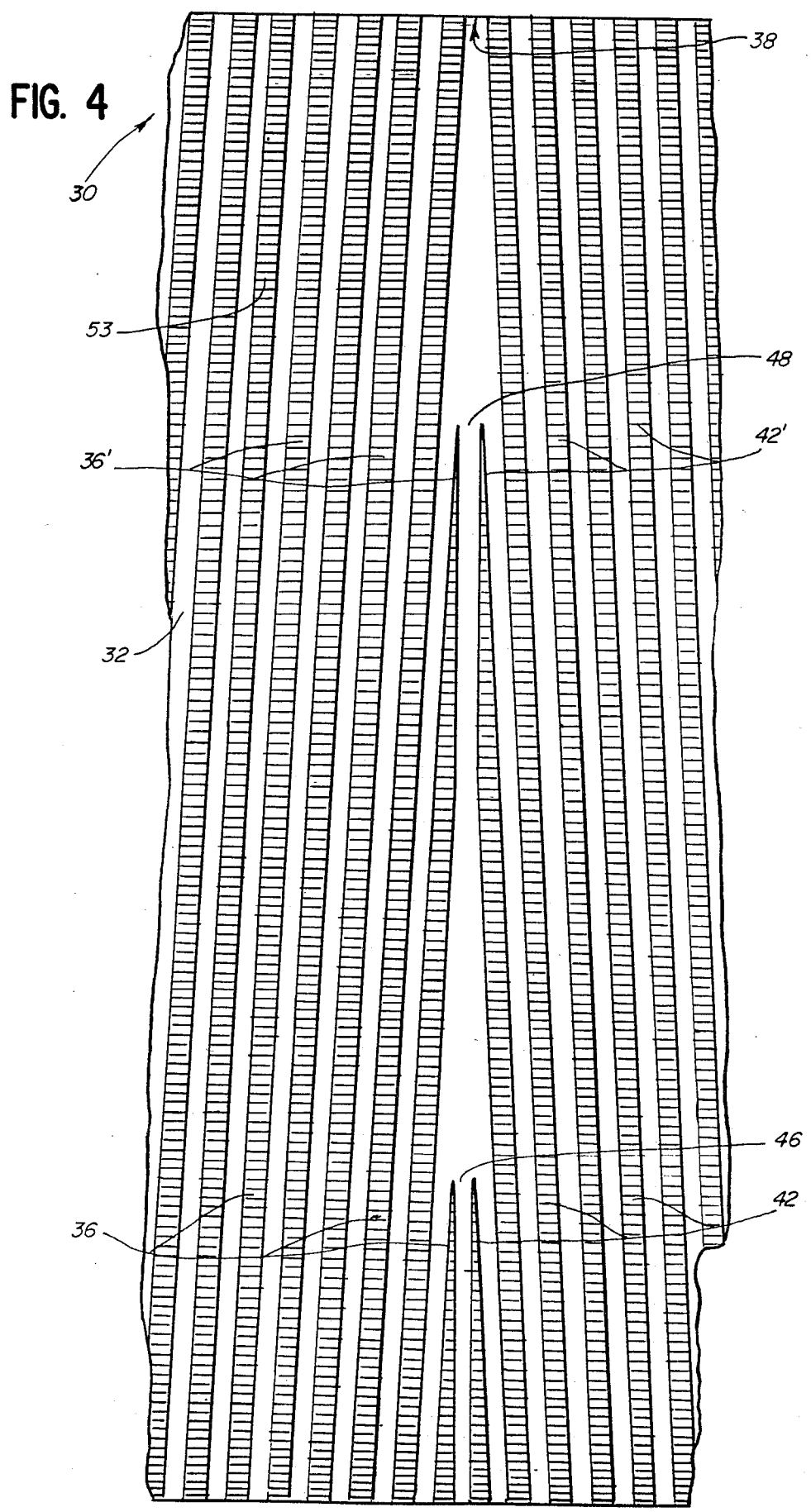

ROLLER WITH DOUBLE LEFT AND DOUBLE RIGHT HELIX PATTERN TRACK

BACKGROUND OF THE INVENTION

1. Field of the Invention

This invention relates generally to conveyor belt rollers, and more particularly, to a novel roller having double helix pattern tracks extending respectively left and right from the midpoint of the roller.

2. Description of the Prior Art

A common problem in use of conveyor belt systems such as for handling and moving luggage at airports, or the like, is the need for proper tracking and alignment of the conveyor belts during use. Conveyor belts have a tendency to drift or move from side to side during operation. Also, it is difficult to align a belt centrally upon the conveyor system rollers when the same initially is installed, or after replacement of a worn belt. A conveyor belt that drifts or wanders from the rollers on which it is mounted during use is subject to excessive wearing of the edges of the belt, and even tearing if the belt catches on or runs against frame parts or other support members of the conveyor system. This results in undesirable down time of the conveyor system for replacement of the worn belt. Initial and continuous centering of a belt when positioned upon conveyor rollers therefore is desired to be achieved quickly upon installation and continuously during operation of the conveying system to prevent excessive wearing and damage to the belt and optimum operating efficiency of a conveyor belt system.

Additionally, it is desirable for the conveyor rollers to have significant gripping traction against the underside of the belt to prevent slipping as the belt is moved upon the rollers. At low speed operation of a conveying system, traction is more easy to maintain than at higher speed operation. Prior art conveyor system speeds often must be maintained at relevantly low rates in order to prevent slipping which occurs at more desirable, higher speed operation.

Further, it is desirable to have a conveyor belt system in which the underside of the belt is kept relatively free of grease, oil, dirt and other debris which has a tendency to built up during operation, resulting in slipping of the belt over its rollers.

It is known in the art to provide conveyor belt rollers with helix pattern tracks which spiral around the roller surface a plurality of times so as to provide said surface with a pair of screw thread-like formations extending substantially the full length of the roller. The prior art rollers having such helix pattern tracks however, include a single left and single right thread only. For many years, such rollers with single right and single left helix threads have been used in conventional conveyor roller systems. The following U.S. patents disclose rollers having such single left and single right helix pattern threads:

| | |
| --- | --- |
| 685,680 | 3,831,243 |
| 2,707,403 | 3,859,865 |
| 2,743,810 | 3,860,780 |
| 3,713,348 | 3,888,131 |
| 3,772,931 | 3,972,414 |
| 3,812,732 | 4,068,789 |
| | 4,140,216 |

The single helix thread pattern rollers of the prior art long have been felt to provide the maximum efficiency attainable for desired tracking and alignment centering and cleaning of conveyor belts during operation.

The roller of the present invention incorporates a respective double helix pattern track running left and right from the midpoint of the roller resulting in a roller having remarkably improved efficiency during initial and continuous high speed operation for better gripping, centering and cleaning of the conveyor belt driven by the roller. It has been ascertained that the double helix pattern tracks of the invention yield dramatic and unexpected increased drive and alignment characteristics over that which normally would be expected. The present invention provides a roller which aligns and centers the belt positioned thereon in substantially less time than that required during use of prior art rollers, resulting in significant maintenance and cost savings and reducing the amount of down time of conveyor systems. The roller with improved helix pattern of the invention also provides for significantly increased frictional gripping characteristics which enables conveyor systems using the roller to be run at greater speeds than those permissible with prior art rollers. Additionally, the double left and double right helix pattern tracks of the invention provide a roller having improved cleaning action on the underside of the belt positioned thereon so that grease, oil and debris are carried away from the underside of the belt more efficiently than in use of prior art rollers.

It is known in the art to provide conveyor rollers with shaft members upon which the rollers are fixed for rotative movement. In instances where such shafts are permanently affixed to the roller, the entire shaft and roller assembly must be removed for replacement even if only a part fails. Also, conveyor system rollers are used both for driving the conveyor belt and as idler rollers at additional locations along the conveyor system. Drive rollers are provided with shaft housings on the ends thereof with engagement means for transferring driving motion from the shaft to the roller. Idler rollers are provided with bearing housings on the ends thereof to permit free wheeling of the roller as the belt moves thereover. Interchangeability of bearing and shaft housings is a desirable feature to permit rollers to be interchanged upon a conveyor belt system for repair or replacement thereof, as necessary.

SUMMARY OF THE INVENTION

The invention is characterized by a conveyor belt roller which is adapted for interchangeable use as a drive head or tail roller with bearing or shaft housings mounted on the respective ends thereof. A pair of opposed, dual helix pattern tracks is provided upon the external circumferential surface of the roller, each pair of tracks spiraling around the roller surface a plurality of times to provide said surface with respective, parallel aligned, pairs of helix pattern tracks extending substantially the full length of the roller in opposite directions from the midpoint thereof. Each pair of tracks commences upon the roller surface proximate the midpoint thereof at respective starting points positioned 180° apart around the roller circumference, and extend the length of the roller.

The respective ends of the roller are provided with mounting plates for interchangeable positioning of respective bearing or shaft housings mounted thereon. The housings are engaged by springs disposed upon the shaft to maintain the same in desired orientation for efficient operation of the roller when positioned in a conveyor belt system.

The roller surface and mounting plate members may be provided with selectively arranged apertures to permit passage of debris therethrough to provide for convenient removal of such debris from the roller surface and inner portions thereof.

Various objects and advantages of the invention will become apparent in accordance with the above and foregoing disclosure in which the preferred embodiments are described in detail in the specification and illustrated in the accompanying drawings. It is contemplated that minor variations may occur to those skilled in the art without departing from the scope or sacrificing any of the advantages of the invention.

BRIEF DESCRIPTION OF THE DRAWINGS

FIG. 4 is an enlarged fragmentary, developed plan view of the mid-section of the roller illustrated in FIG. 2 showing the thread pattern of the invention;

DESCRIPTION OF THE PREFERRED EMBODIMENTS

Figure 3:
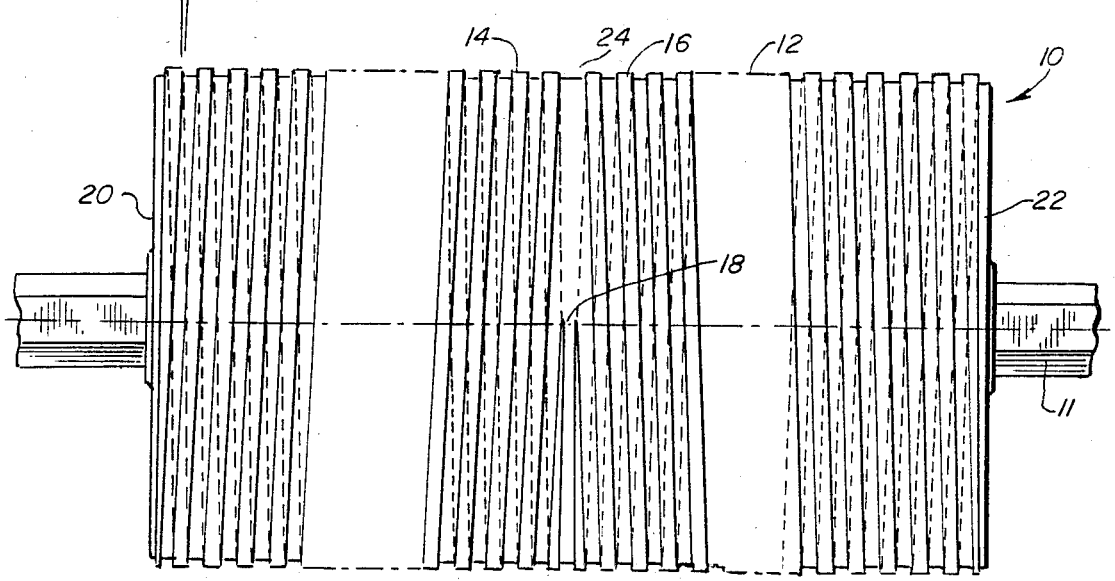
FIG. 3 is a plan view of a prior art roller having a single left and single right thread pattern only.

FIG. 3 illustrates a prior art conveyor belt roller 10 mounted for rotative movement on shaft 11. Roller 10 has a circumferential external surface 12 upon which is formed two helix pattern tracks 14, 16 which spiral around surface 12 a plurality of times so as to provide said surface with a pair of screw thread-like formations extending substantially the full length of the roller 10. Each helix pattern track 14, 16 commences on the surface 12 proximate a common point 18 located at approximately the midpoint 24 of roller 10 and spirals toward the respective opposite ends 20, 22. Thus, track 14 spirals from the midpoint 24 to the left as viewed in FIG. 3, and track 14 spirals from the proximate midpoint 24 to the right. The prior art roller 10 comprises a single left track 14 and a single right track 16 only.

As seen in FIGS. 1, 2, 4 and 10, roller 30 of the invention comprises a circumferential external surface 32 and is mounted for rotative movement about shaft 34. Surface 32 is formed with a respective double helix pattern track or thread 36, 36' which commences at the proximate midpoint 38 of roller 30, and moves to the left end 40 as viewed in FIG. 2, and another double helix pattern track or thread 42, 42' which commences proximate the midpoint 38 of roller 30 and moves to the right and 44 of roller 30. Each double helix pattern track 36, 36' and 42, 42' spirals around the roller surface 32 a plurality of times so as to provide said surface with respective, parallel aligned, oppositely directed pairs of screw thread-like track or thread formations extending substantially the full length of the roller 30.

Figure 2:
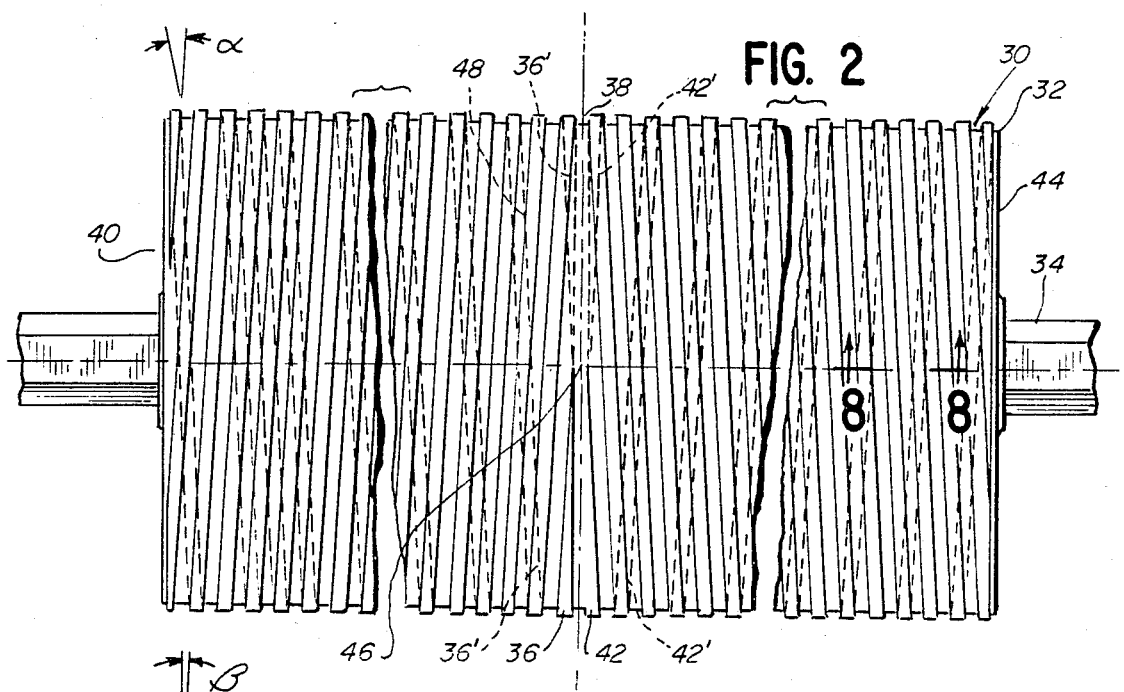
FIG. 2 is a plan view, partially fragmentary, of a roller having the helix pattern track of the invention.

As best seen in FIGS. 2 and 4, thread 36 commences on the surface 32 of the roller 30 proximate a point 46 and spirals toward the left to the end 40. Tread 42 commences on surface 32 proximate the same point 46 and spirals toward right end 44. Thread 36' commences on surface 32 proximate commencement point 48 which is located 180° around the roller circumference with respect to commencement point 46, and spirals toward left end 40. The spirals of thread 36' pass between, and are aligned parallel with respect to, the spirals of thread 36 as the two threads 36, 36' move toward the left end 40. Thread 42' commences on surface 32 proximate commencement point 48 and spirals toward rightend 44. The spirals of thread 42' pass between and are aligned parallel with respect to the spirals of thread 42 as the two threads 42, 42' move toward the right end 44. The roller 30 of the invention thereby comprises a respective dual helix pattern thread or track 36, 36' and 42, 42' running in opposite directions from the proximate midpoint 38 so that there are a total of four tracks which are present on the surface 32.

Two comparatively sized rollers 10, 30 illustrated in respective FIG. 3 and FIG. 2, have approximately the same number of threads per inch. However, roller 30 of the invention has two sets of parallel threads 36, 36' and 42, 42' which spiral respectively in opposite directions from the midpoint 38 thereof instead of respective single threads 14, 16 of the prior art roller 10 which spiral left and right from the midpoint 34. The angle or pitch of threads 36, 36' and 42, 42' is steeper or greater than the angle or pitch of threads 14, 16. The greater angle of threads 36, 36' and 42, 42' results from the dual thread arrangement of roller 30.

Figure 9:
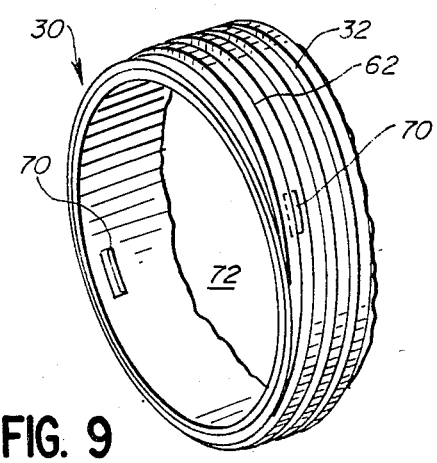
FIG. 9 is a fragmentary perspective view of a modified form the roller of the invention illustrating the clean-out apertures formed therein.
Figure 8:
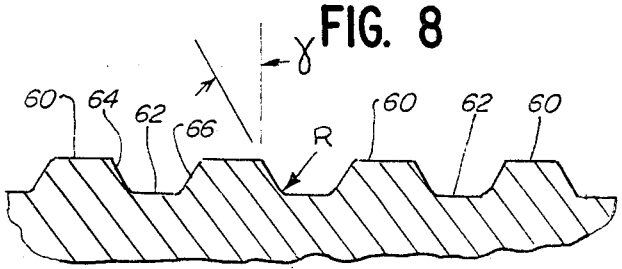
FIG. 8 is an enlarged sectional view taken along the line 8—8 of FIG. 2 in the direction indicated generally.
Figure 10:
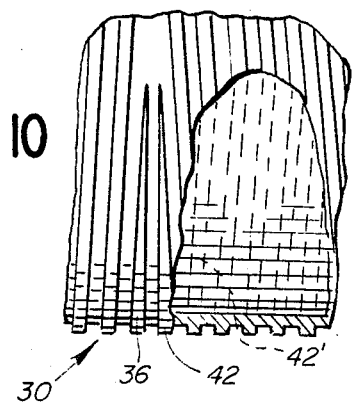
FIG. 10 is a fragmentary view of a portion of the roller illustrated in FIG. 2 with a front section thereof broken away.

The general cross-sectional configuration of threads 36, 36' and 42, 42' is seen best in FIG. 8. Each thread includes a land 60 separated by a groove 62 between the next adjacent land 60. Preferably, each groove 62 is formed of respective side walls 64, 66 which extend at an angle of approximately 29° with respect to normal. Side walls 64, 66 are joined at the bottom surface of groove 62 by a rounded radius R of approximately 1/32 inch. The radius R between the bottom surface of groove 62 and side walls 64, 66 assists in preventing grit and other undesirable material from accumulating within grooves 62. Additionally, as seen in FIG. 9, the surface 32 of roller 30 may be provided with selectively spaced apertures 70 at locations within groove 62 to permit passage of grit or other debris from the roller surface to the interior portion 72 of the roller for subsequent removal in a manner described hereinafter.

Figure 1:
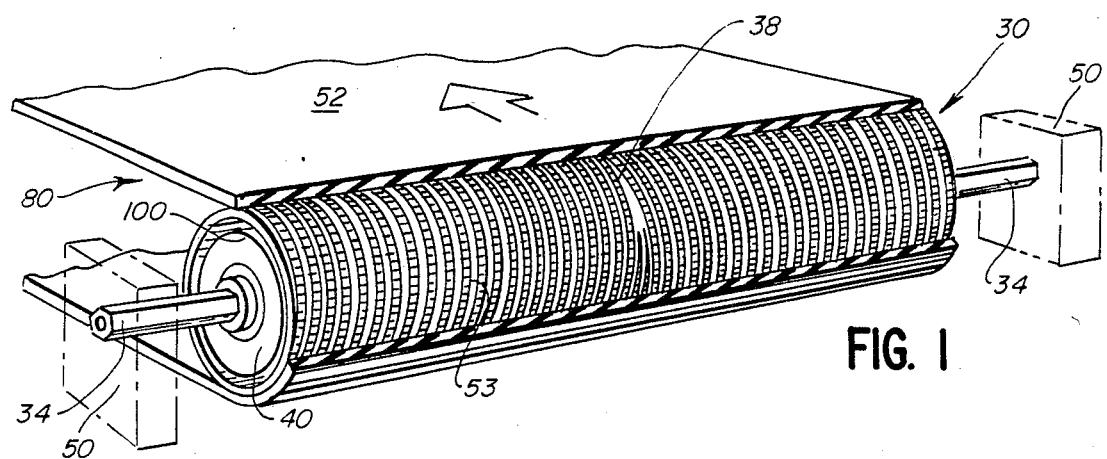
FIG. 1 is a perspective view of a portion of a conveyor belt system incorporating the roller of the invention, with a section of the conveyor belt removed to illustrate the helix pattern track or thread of the roller.

As seen in FIG. 1, roller 30 is adapted for positioning in a conveyor belt system 80 such as that used in airports for moving luggage, or the like, between locations. In use, roller 30 mounted on shaft 34 is supported by support members 50. A web or belt 52 is positioned upon roller 30 to be either driven by the roller, if the same is used as a drive roller, or supported thereby if the same is used as an idler roller. Mounting plates 100 at the respective ends of roller 30 are adapted for receipt of bearing or shaft housings in a manner described hereinafter to permit operation of roller 30 as a drive or idler roller. Threads 36, 36' and 42, 42' may be provided with grooves or serrations 53 to enhance the gripping characteristics of the threads against the underside of the belt 52.

Ends 40, 44 of roller 30 (FIGS. 5, 6 and 7) are provided with respective stationary mounting plates 100 secured by weldment 102 or other permanent means. Each plate 100 includes a centrally located passageway 104 defined by angularly disposed wall 106 which provides a seat for a bearing or drive shaft housing. Respective bearing housings 110 may be positioned upon mounting plates 100 with shaft 34 carried therein. A respective stop member 112 is secured to shaft 34 at a location within roller 30 spaced from the opposite ends thereof with a compression spring 114 located on the shaft between each stop member and bearing housing 110. Bearing housing 110 having peripheral angularly disposed wall 107 is positioned upon mounting plate 100 with locating pins 116 received within receptacles 118 and wall 107 seated in passageway 104 against wall 106. Screws 120 secure housing 110 to mounting plate 100 at spaced locations around said housing. Springs engaged against bearing housing 110 maintain proper orientation of roller 30 upon shaft 34 as desired when the roller is installed in the conveyor system 80.

Shaft 34 is provided with grease fittings 130 at its respective ends and axial passageways 131 between the fittings and locations proximate bearing housing 110 to permit grease to be delivered to the bearings through grease ports 132. Compression springs 114 and stop members 112 maintain bearing housing 110 in proper orientation with respect to said grease ports 132 so that the grease is deposited in the proper location. Bearing removal screws 134 are provided in bearing housing 110 through threaded passageways 136 to assist in removal of the bearing housing from mounting plate 100 by turning the screws, the ends 135 of which abut the surface 101 of mounting plates 100 (see FIG. 7). A snap-fit ring 138 is provided as additional securement for bearing housing 110 upon mounting plate 100.

Figure 11:
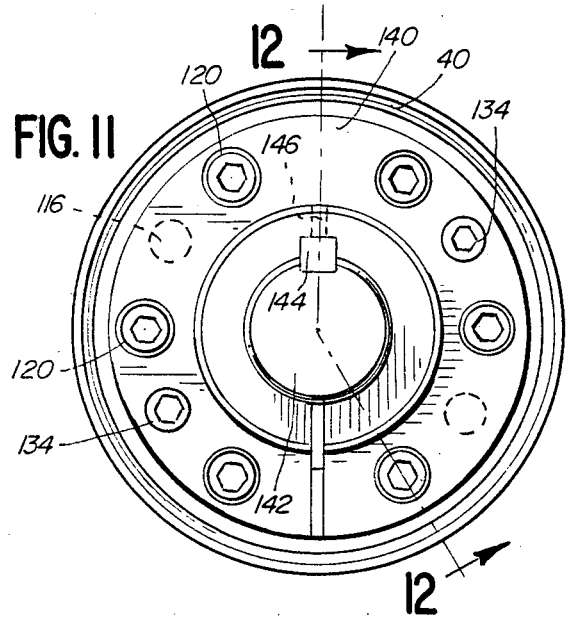
FIG. 11 is an end view of a roller constructed in accordance with the invention having a drive shaft housing positioned thereon.
Figure 12:
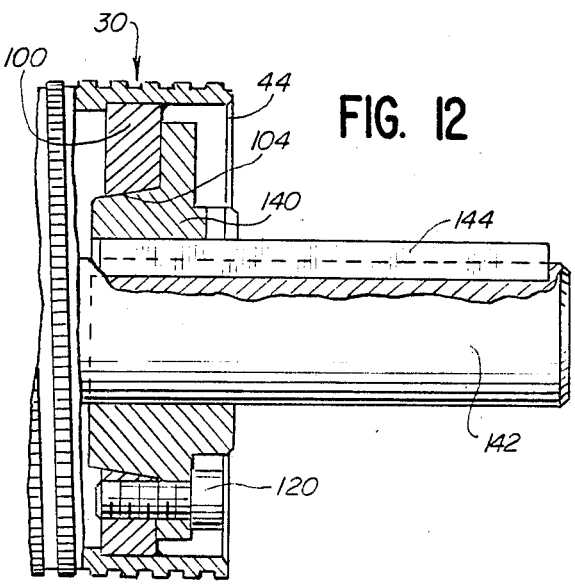
FIG. 12 is a partial sectional view taken along the line 12—12 of FIG. 11 in the direction indicated generally.

Bearing housing 110 is removable or interchangeable upon roller 30 in the event of damage thereto or other need for replacement of the roller when it is installed upon conveyor belt system 80. Additionally, bearing housing 110 may be interchanged with drive shaft housing 140 illustrated in FIGS. 11 and 12. Drive shaft housing 140 is secured to, or removed from, mounting plate 100 in the same manner described in connection with bearing housing 110. Drive shaft housing 140 is adapted for cooperating with drive shaft 142 which includes a flange 144 engageable within channel 146 to impart rotative movement from the shaft to roller 30 and thereby drive belt 52 in the conveyor belt system 80.

It will be seen that, by reason of the interchangeability of drive shaft housing 140 and bearing housing 110 in mounting plates 100, rollers 30 may be interchanged or replaced as desired without replacing the housings positioned on the ends thereof. When the need for replacement of a shaft arises, the housings are removable for use with a new roller, as required. Also, because the housings are interchangeable, specifically constructed rollers for use as drive rollers or idler rollers need not be retained as replacement parts because the roller of the invention is useable in either manner upon positioning of the desired housings at the ends thereof. The roller 30 also may be repaired conveniently on site where it is used by replacement of the housing parts thereof.

Figure 6:
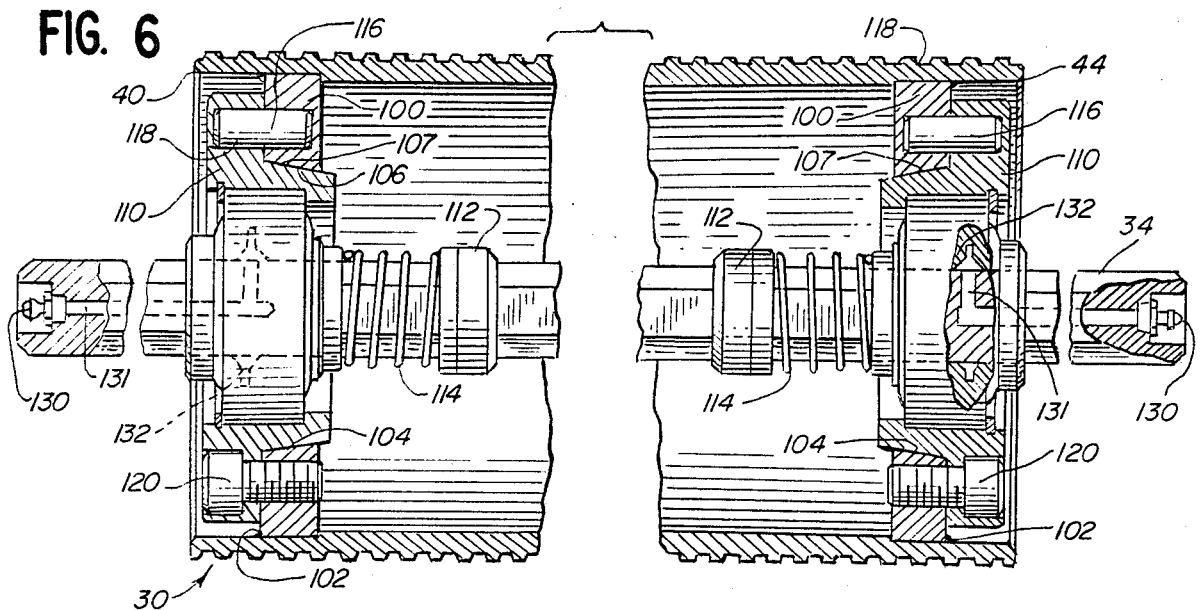
FIG. 6 is a sectional view taken along the line 6—6 of FIG. 5 in the direction indicated generally.
Figure 5:
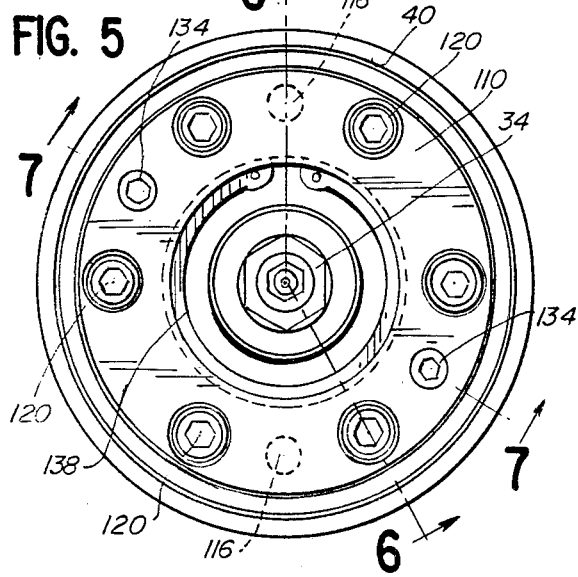
FIG. 5 is an end view of a roller constructed in accordance with the invention having a bearing housing positioned thereon.
Figure 7:
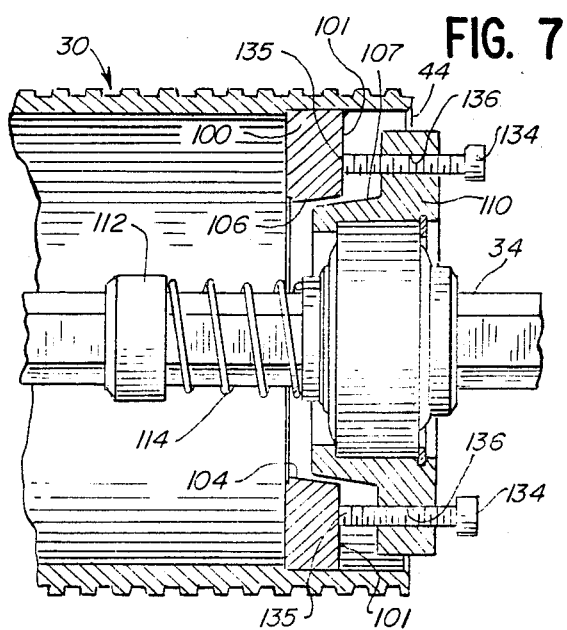
FIG. 7 is a sectional view taken along the line 7—7 of FIG. 5 in the direction indicated generally, but with the bearing housing moved to a partially withdrawn position from its mounting plate.
Figure 13:
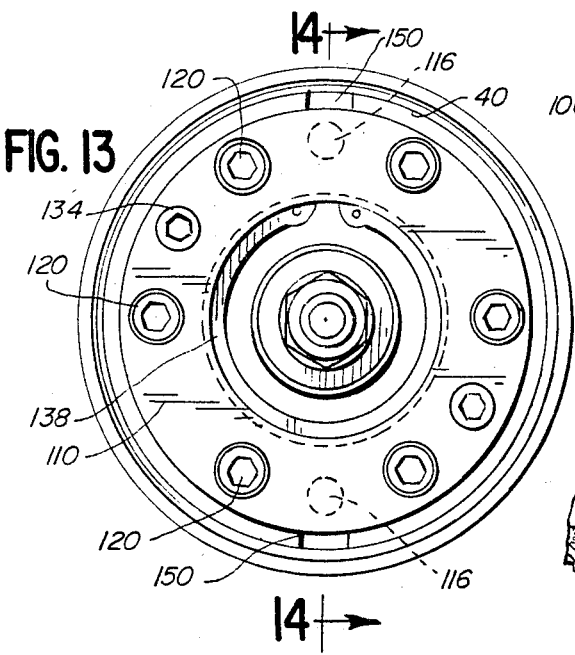
FIG. 13 is an end view of a roller constructed in accordance with the invention having a modified bearing housing positioned thereon with passageways to permit removal of debris from within the roller.
Figure 14:
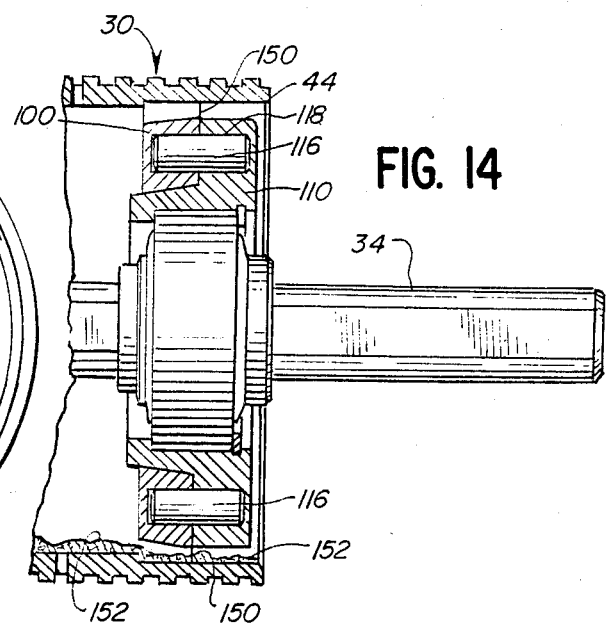
FIG. 14 is a sectional view taken along the line 14—14 of FIG. 13 in the direction indicated generally.

FIGS. 13 and 14 illustrate a modified form of the bearing housing shown in FIGS. 5, 6 and 7. The bearing housing of FIGS. 13 and 14 is the same as that shown in FIGS. 5, 6 and 7, except passageways 150 are provided through bearing housing 110 and mounting plate 100. Passageways 150 permit removal of grit or other debris 152 which has accumulated within roller 30, such as by passage through apertures 70 illustrated in FIG. 9

During testing of roller 30 it has been determined that the dual left and dual right helix pattern threads provide unexpectedly great improvement over the operation of prior art rollers. The double left and double right helix pattern threads cause conveyor belts to be centered upon the roller and maintained self-centered thereon much more quickly and efficiently than with prior art rollers. The thread pattern of the roller of the invention also results in carrying away of debris from the underside of a conveyor belt much faster than in prior art rollers.

A comparative test of the roller of the invention installed in one conveyor belt system and the roller of the prior art installed in another system demonstrated the dramatic increase in performance features of the roller of the invention over that of the prior art. The two conveyor belt systems were operated continually on a day-to-day basis for approximately eighteen hours per day with a load of luggage of minimum estimated total weight of 1,920,000 lbs., traveling at a speed of approximately 105 ft. per min. After three days operation, the conveyor belt in the system having the prior art roller installed had frayed edges which indicated that it was mistracking because frayed edges result from the belt running up against the conveyor bed frame. During the same period, the belt in the system with the roller of the invention installed was in excellent condition and had no sign of frayed edges due to mistracking.

After twenty-four days operation, the belt in the system having the roller of the invention was still in excellent condition. Inspection of the roller for debris build-up from the underside of the belt revealed none, indicating that the cleaning action of the roller tracks was functioning efficiently and whatever build-up was occurring was being disposed of by the cork-screwing action of the roller surface. During the same period, the belt of the system having the prior art roller installed showed signs of deteriorating; the belt had loose, frayed edges, lacing damage and surface cracks indicating that the belt was mistracking quite often. The prior art roller surface also was caked with debris build-up which also could have caused belt wandering resulting in damage to the belt.

After continued operation of the two systems for twenty-three more days, the belt in the system having the prior art roller showed signs of fatigue. Adjustments had to be made in the system to apply tension to the belt; the belt edges were frayed even more and had long strings from frayed edges that were lodged around an idler roller shaft between the bearing and the conveyor bed frame causing the idler roller to freeze up, rendering it useless. This would cause the belt to mistrack even more. After the same period, the belt in the system with the roller of the invention showed no signs of frayed edges; the belt lacing was intact and belt-wandering had not occurred.

Additional tests were conducted to determine the comparitive length of time required for a mistracked belt in each system to be returned to center. The belt in the system with the prior art roller traveling along a fifty foot long conveyor at 105 ft. per min. with no load was caused to mistrack by approximately four inches. The time required for the belt to recover to center was thirty seconds. Using the same parameters, the belt in the system with the roller of the invention required approximately fifteen seconds only to recover to center. Thus, the roller of the invention caused a mistracked belt to self-center in approximately one-half the time that was required with use of the prior art roller.

The fifty foot long conveyor belt in the system having the prior art roller again was mistracked four inches off center, stopped and a load of approximately two hundred forty lbs. was deposited on its tail end. The conveyor was then started. The load took approximately thirty seconds to travel the fifty foot length but the belt did not self-center itself until approximately thirty-five seconds, so the load was deposited "off center" on a next adjacent conveyor section, with the possible result of jamming the conveyor system with misdeposited loads causing system shut down. The same test of the system having the roller of the invention yielded dramatically improved results. The load traveled the fifty foot length in approximately nineteen seconds, before which time the belt had self-centered itself and deposited the load "on center" on the next adjacent conveyor section.

The conclusions reached by these tests were that the roller of the invention is capable of much faster belt self-centering yielding savings of cost and maintenance, and reducing the amount of down time of conveyor systems. In the conveyor belt system using the roller of the invention, the belt tensions never required adjustment, indicating that the double left and double right helix thread pattern resulted in greatly improved gripping ability.

In a preferred embodiment of the invention, there are 2½ threads per inch, the roller has 6.585 in. O.D., the pitch of each thread is 0.800 in., the pitch angle is 2° 13', the width of each groove is 0.188 in. and the width of each land is 0.212 in. However, it is to be understood that these dimensions are for purposes of example only and are capable of wide variation. Minor variations in the structure and other variations in the arrangement and size of the various parts of the invention may occur to those skilled in the art without departing from the spirit or circumventing the scope of the invention as set forth in the appended claims. For instance, where rollers having greater diameter are used, it may be desirable to incorporate a triple helix pattern left and right thread, or even a quadrupal helix pattern, or more threads. Where multiple pattern threads are used, each thread of the respective groups commences at a point equally spaced about the roller circumference: 120° for triple pattern; 90° for quadrupal pattern; etc.

I claim:

1. A generally cylindrical belt roller comprising, at least one stationary mounting plate as secured to an end of the roller, said plate including a centrally located seat for receipt of a removable housing retained on said seat by at least one attachment bolt which passes through both said housing and said plate, and at least one housing removal screw passing through the housing and abutting the surface of the mounting plate to assist in removal of the housing from the plate after said at least one bolt has been removed.

2. A roller as claimed in claim 1 in which the centrally located seat is adapted for interchangeable receipt of a bearing housing or shaft housing retained thereon.

3. A roller as claimed in claim 1 including a plurality of helix pattern threads on the external cylindrical surface thereof, and selectively spaced apertures between said threads to permit passage of debris from the roller surface to the interior of the roller.

4. A roller as claimed in claim 1 in which said plate and housing include at least one respective passageway into the roller interior to permit removal of debris therefrom.

5. A roller as claimed in claim 1 in which said seat includes an angularly disposed wall and the housing includes a peripheral angularly disposed wall for positioning within said seat.

* * * * *